United States Patent
Noda

(10) Patent No.: US 6,839,019 B2
(45) Date of Patent: Jan. 4, 2005

(54) PULSE RADAR DEVICE

(75) Inventor: Shinsaku Noda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/441,053

(22) Filed: May 20, 2003

(65) Prior Publication Data

US 2004/0061642 A1 Apr. 1, 2004

(30) Foreign Application Priority Data

Sep. 26, 2002 (JP) ........................................ 2002-281013

(51) Int. Cl.$^7$ .......................... G01S 13/08; G01S 13/00
(52) U.S. Cl. .......................... 342/130; 342/70; 342/145
(58) Field of Search .......................... 342/70, 71, 128, 342/130, 145, 189, 200, 201, 89–92, 107, 108

(56) References Cited

U.S. PATENT DOCUMENTS

| | | | | |
|---|---|---|---|---|
| 3,680,085 A | * | 7/1972 | Del Signore | 342/128 |
| 4,232,315 A | * | 11/1980 | Kern | 342/145 |
| 4,562,438 A | * | 12/1985 | Rouse et al. | 342/201 |
| 5,001,486 A | * | 3/1991 | Bachtiger | 342/42 |
| 5,109,231 A | * | 4/1992 | Olsson | 342/145 |
| 5,966,090 A | * | 10/1999 | McEwan | 342/27 |
| 6,184,820 B1 | * | 2/2001 | Kratzer | 342/160 |

FOREIGN PATENT DOCUMENTS

JP          2586184 B2      12/1996

* cited by examiner

Primary Examiner—Bernarr E. Gregory
Assistant Examiner—Brian Andrea
(74) Attorney, Agent, or Firm—Sughrue Mion, PLLC

(57) ABSTRACT

A pulse radar device includes a VCO that oscillates a carrier wave that has been modulated in frequency, a switch that modulates the carrier wave generated by the VCO to a pulse wave, a transmission antenna that transmits the pulse wave that has been modulated by the switch as an electromagnetic wave, a reception antenna that receives a reflection wave obtained by reflecting the electromagnetic wave that has been transmitted by the transmission antenna by a target substance, a mixer that demodulates the reception signal that has been received by the reception antenna on the basis of the carrier wave that has been generated by the VCO, and a limiter that limits an amplitude of the demodulation signal which has been demodulated by the mixer.

4 Claims, 8 Drawing Sheets

PULSE RADAR DEVICE

BACKGROUND OF THE INVENTION

1. Field of the Invention

The present invention generally relates to a pulse radar device for measuring a distance between two vehicles.

2. Description of the Related Art

A conventional pulse radar device is so designed as to modulate a transmission wave to a pulse wave by a high-speed high-frequency wave switch and detect a reflection wave during reception, to detect a vehicle (for example, refer to Japanese Patent Publication No. 2586184, page 2, FIG. 1).

In the above-mentioned radar device, a larger signal (hereinafter referred to as "leakage signal") than a reflection wave from a target substance is inputted to a mixer similarly to the reception signal due to a leakage of a signal to a circulator, a reflection of the signal by an antenna, or the like. Therefore, there arises such a problem that the reflection wave from the target substance cannot be detected by the saturation of the amplifier.

SUMMARY OF THE INVENTION

The present invention has been made to solve the above-mentioned problem, and therefore an object of the present invention is to provide a pulse radar device which is capable of excellently detecting a target substance even if there exists leakage of a signal to a circulator, reflection of the signal by an antenna, or the like.

A pulse radar device according to the present invention includes: an oscillation means for oscillating a carrier wave which has been frequency-modulated; a pulse modulation means for modulating the carrier wave generated by the oscillation means to a pulse wave; a transmission means for transmitting the pulse wave modulated by the pulse modulation means as an electromagnetic wave; a reception means for receiving a reflection wave obtained by reflecting the electromagnetic wave transmitted from the transmission means by a target substance; a demodulation means for demodulating a reception signal received by the reception means on the basis of the carrier wave generated by the oscillation means; and a limiting means for limiting an amplitude of a demodulation signal demodulated by the demodulation means.

There is obtained such an effect that the target substance can be excellently detected without a variation of the leakage signal affecting a reverse response.

BRIEF DESCRIPTION OF THE DRAWINGS

These and other objects and advantages of the present invention will become more fully apparent from the following detailed description taken with the accompanying drawings in which.

DETAILED DESCRIPTION OF THE PREFERRED EMBODIMENTS

Now, a description will be given in more detail of preferred embodiments of the present invention with reference to the accompanying drawings.

(First Embodiment)

Figure 1:
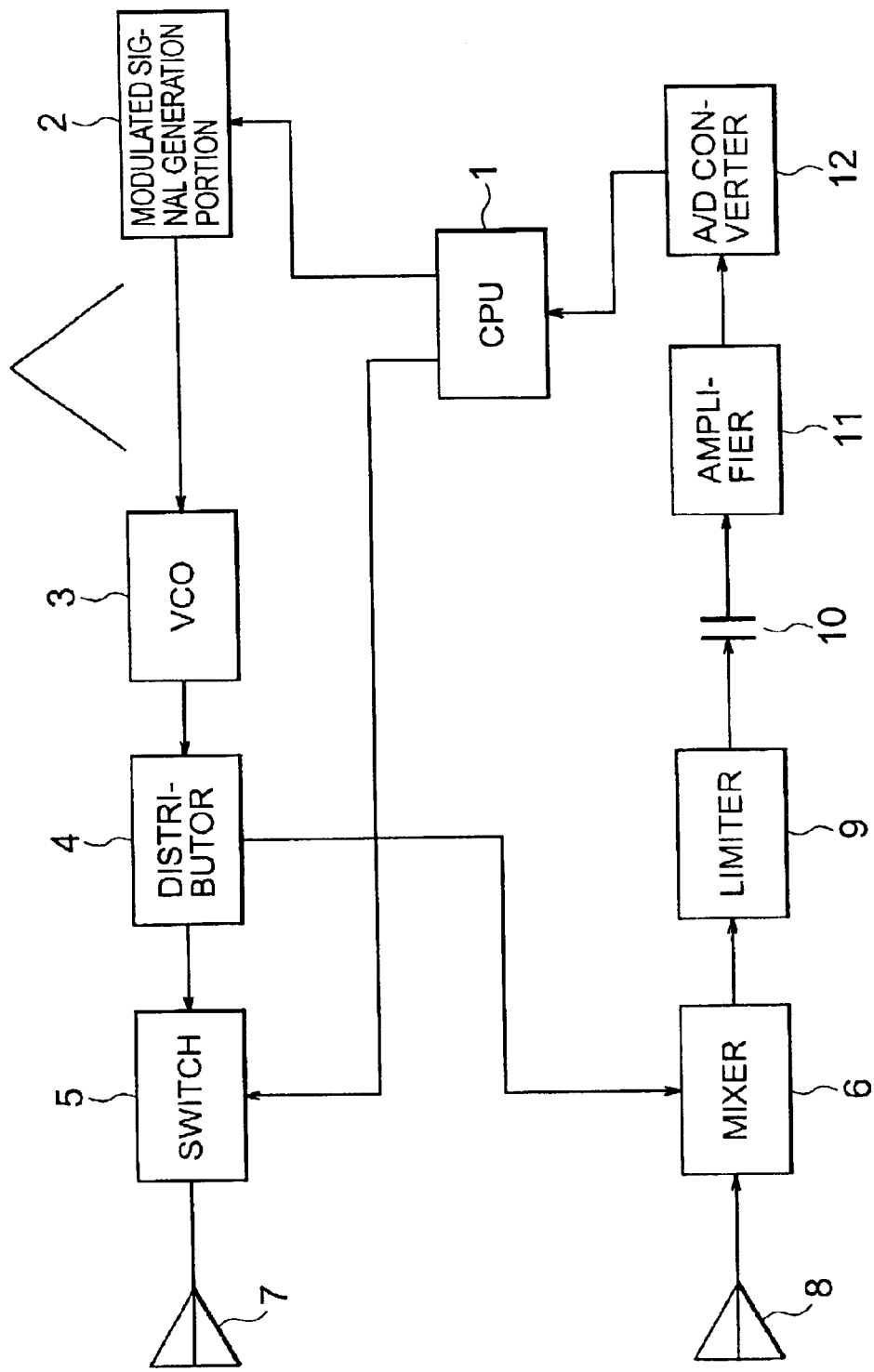
FIG. 1 is a diagram showing a structure of a pulse radar device in accordance with a first embodiment of the present invention.

A pulse radar device in accordance with a first embodiment of the present invention will be described with reference to the drawings. FIG. 1 is a diagram showing a structure of the pulse radar device in accordance with the first embodiment of the present invention. Note that, the same reference numerals denote identical or equivalent parts in the figures.

In FIG. 1, a CPU 1 is connected with a modulation signal generation portion 2 that generates a modulation signal. The modulation signal generation portion 2 is connected with a VCO (voltage controlled oscillator) (oscillation means) 3, and the VCO 3 is connected with a distributor 4. In addition, the distributor 4 is connected with a switch (pulse modulation means) 5. The switch 5 is connected with the CPU 1 and a transmission antenna (transmission means) 7.

Also, in the figure, the distributor 4 and a reception antenna (reception means) 8 are connected with a mixer (demodulation means) 6. In addition, the mixer 6 is connected with a limiter (limiting means) 9, and the limiter 9 is connected with a capacitor 10. Also, the capacitor 10 is connected with an amplifier (amplification means) 11, and the amplifier 11 is connected with an A/D converter 12. The A/D converter 12 is also connected to the CPU 1.

Subsequently, the operation of the pulse radar device in accordance with the first embodiment of the present invention will be described with reference to the drawings.

Figure 2:
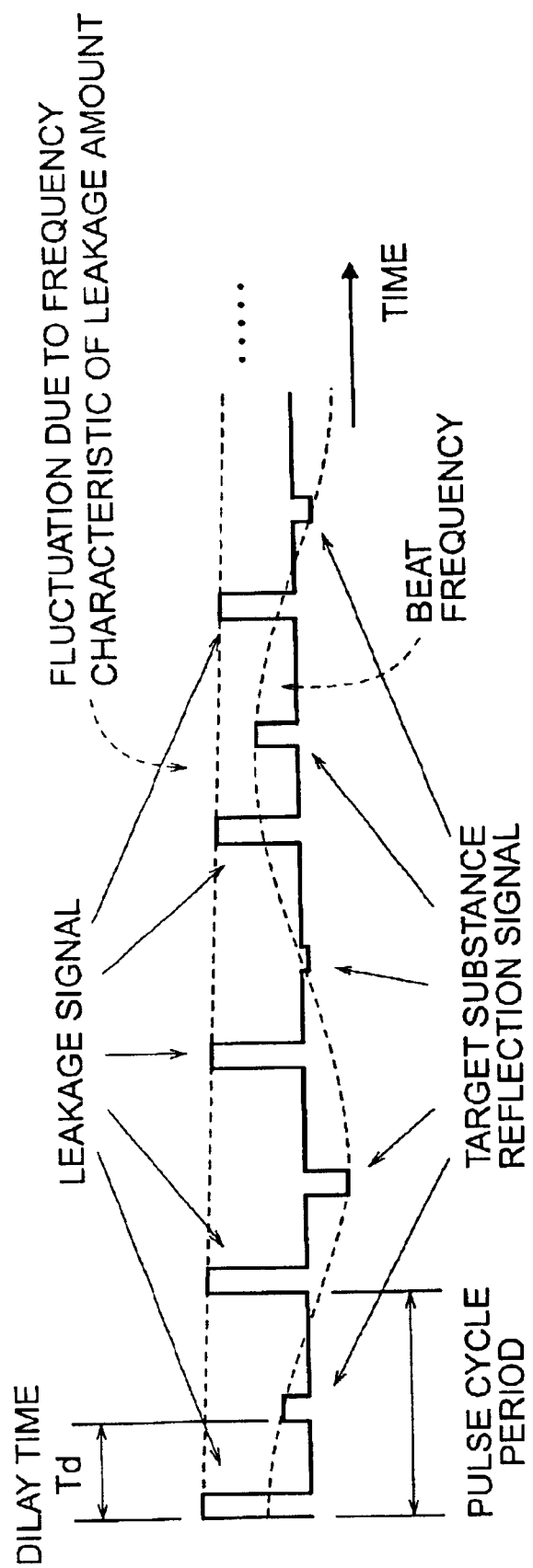
FIG. 2 is a graph showing a waveform of a reception signal which is outputted from a mixer of the pulse radar device in accordance with the first embodiment of the present invention.
Figure 3:
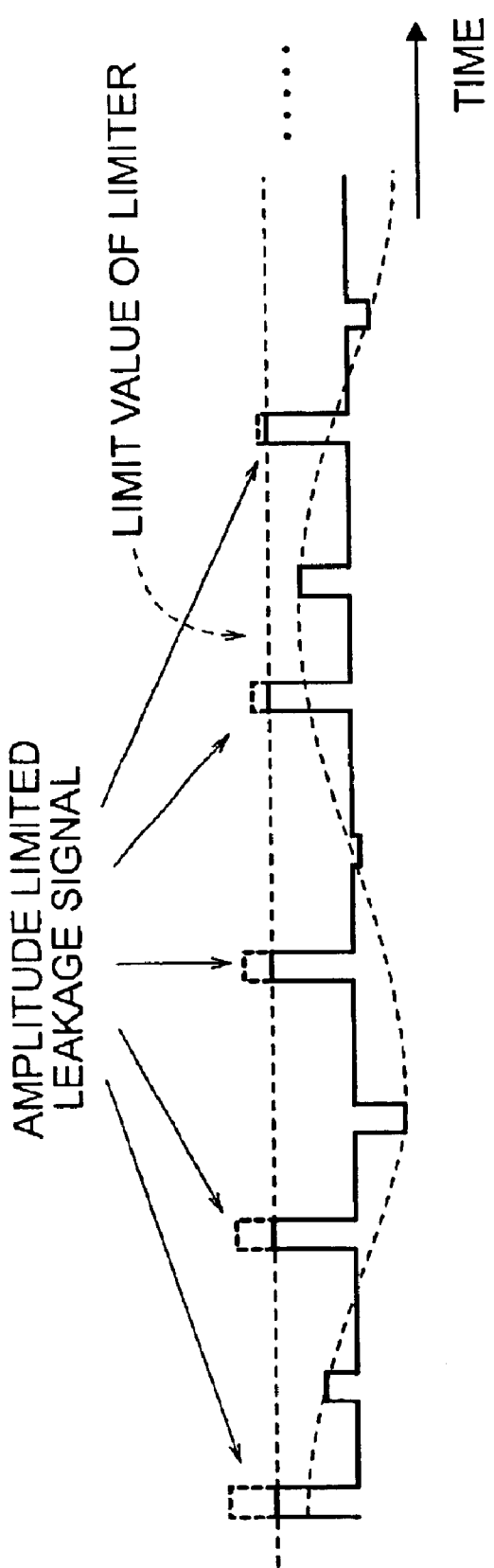
FIG. 3 is a graph showing a waveform of a signal which is outputted from a limiter of the pulse radar device in accordance with the first embodiment of the present invention.
Figure 4:
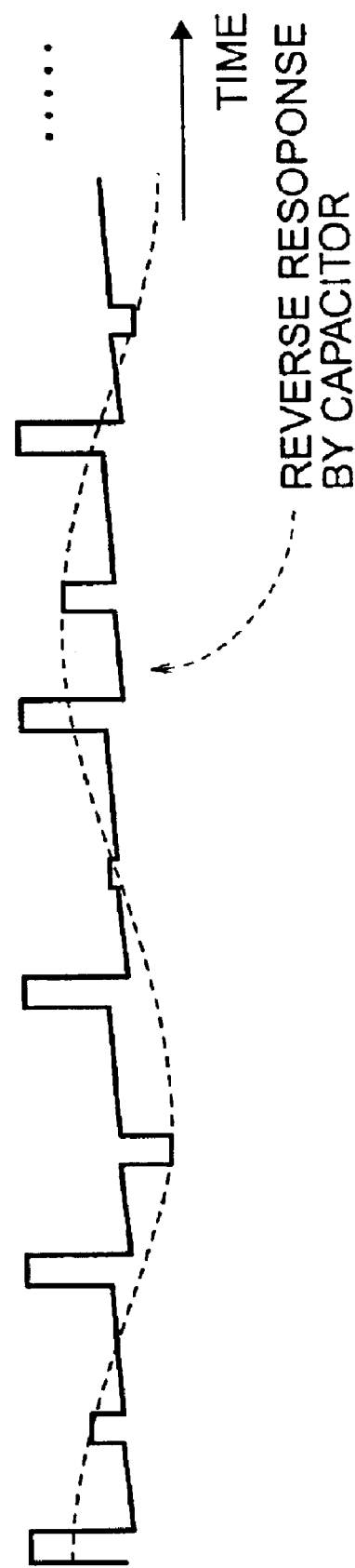
FIG. 4 is a graph showing a waveform of a signal which is outputted from an amplifier of the pulse radar device in accordance with the first embodiment of the present invention.

FIG. 2 is a graph showing a waveform of a reception signal which is outputted from a mixer of the pulse radar device in accordance with the first embodiment of the present invention. Also, FIG. 3 is a graph showing a waveform of a signal which is outputted from a limiter of the pulse radar device in accordance with the first embodiment of the present invention. Further, FIG. 4 is a graph showing a waveform of a signal which is outputted from an amplifier of the pulse radar device in accordance with the first embodiment of the present invention.

The modulation signal generation portion 2 which is controlled by the CPU 1 generates a modulation signal for performing the frequency modulation of the VCO 3. The carrier wave generated by the VCO 3 which has been modulated in frequency is distributed into the switch 5 and the mixer 6 by the distributor 4. In the switch 5, the pulse modulation is conducted by the control of the CPU 1, and the pulse-modulated signal is supplied to the transmission antenna 7. The pulse-modulated signal is transmitted to the target substance as an electromagnetic wave by the transmission antenna 7.

The reflection wave reflected by the target substance is received by the reception antenna 8. The received signal is transmitted to the mixer 6. In the mixer 6, the reception signal is demodulated by a local signal from the distributor 4, and becomes a pulse signal with a delay time corresponding to a distance to the target substance as shown in FIG. 2.

In this example, the reception signal that has been demodulated by the mixer 6 will be described with reference to FIG. 2. The transmission signal becomes the electromagnetic wave and is outputted from the transmission antenna 7 as in the general pulse radar, and is then reflected by the target substance apart by a distance R and appears in the reception signal with a delay of a time Td required until the signal is received by the reception antenna 8. In this example, assuming that a light velocity is represented by c, the time Td is calculated by the following expression (1)

$$Td=2R/c \quad (1)$$

Also, in the pulse radar device in accordance with the first embodiment, a signal whose delay time is 0, that is, a leakage signal appears in the reception signal, for example, due to an electromagnetic coupling from the transmission antenna 7 to the reception antenna 8.

Further, because the carrier wave has been subjected to the same frequency modulation as the general FMCW (frequency modulated continuous wave) radar, the level of the reflection signal from the target substance fluctuates due to the beat frequency responsive to the distance and the relative speed to the target substance. The level of the leakage signal also fluctuates with the modulation of the carrier wave due to the frequency characteristic of the leakage amount.

Then, the demodulated pulse signal is limited in amplitude by the limiter 9. This state is shown in FIG. 3. The leakage signal is limited in amplitude by the limiter 9 to be kept constant without fluctuation.

Then, the pulse signal that has been limited in amplitude is amplified by the amplifier 11 after passing through the capacitor 10 that removes a d.c. component. The output signal of the amplifier 11 is shown in FIG. 4. A reverse response appears due to the capacitor 10, and the reflection signal from the target substance is superimposed on the reverse response.

Then, the pulse signal that has been amplified by the amplifier 11 is quantized by the A/D converter 12, to thereby calculate the distance and the relative speed to the target substance by the CPU 1.

As described above, since the amplitude limitation is conducted by the limiter 9 before the reverse response due to the capacitor 10 appears, the target substance can be excellently detected without any influence of the fluctuation of the leakage signal on the reverse response.

(Second Embodiment)

Figure 5:
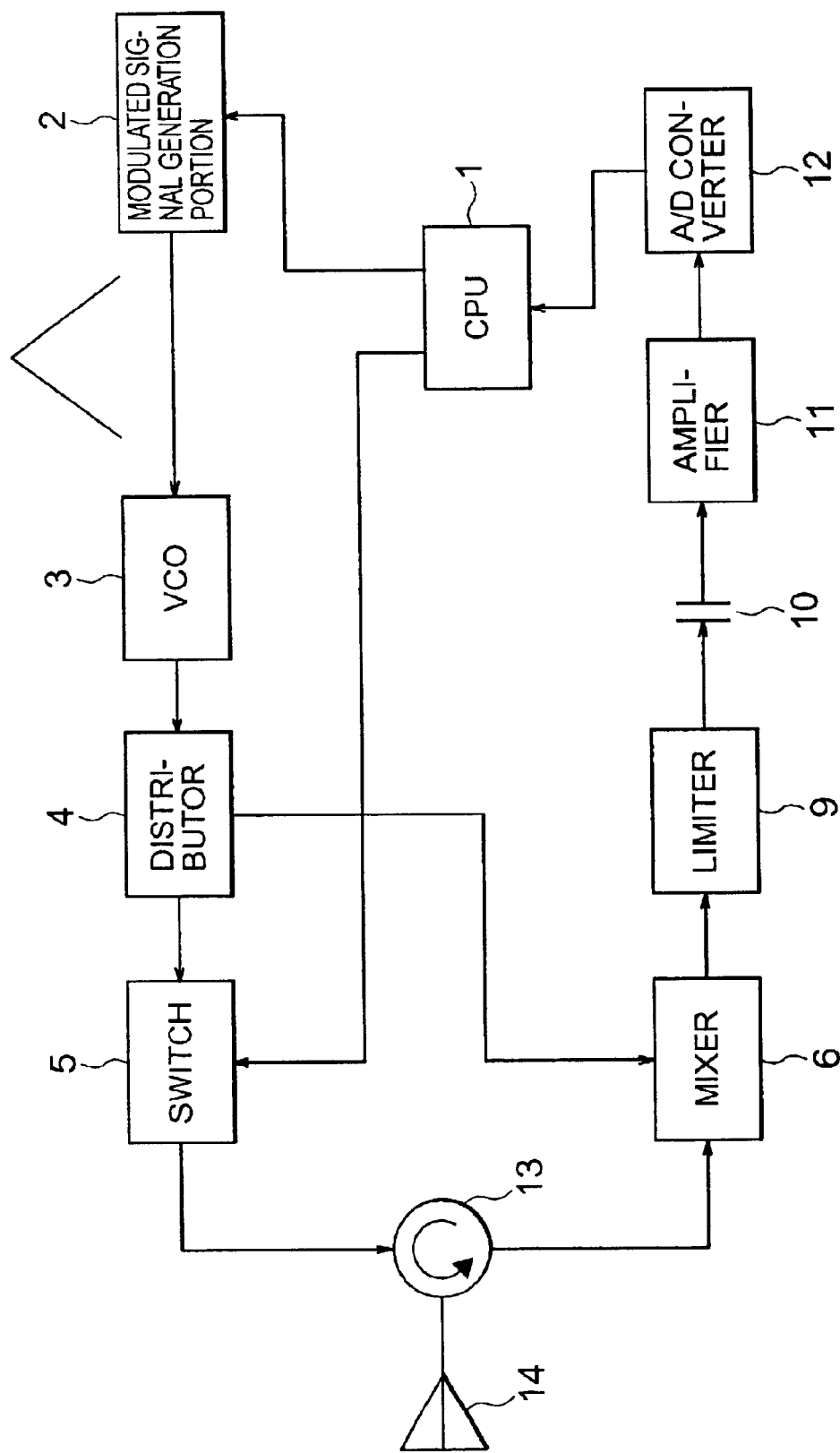
FIG. 5 is a diagram showing a structure of a pulse radar device in accordance with a second embodiment of the present invention.

A pulse radar device in accordance with a second embodiment of the present invention will be described with reference to the drawings. FIG. 5 is a diagram showing a structure of the pulse radar device in accordance with the second embodiment of the present invention.

In FIG. 5, according to the second embodiment, the transmission antenna 7 and the reception antenna 8 of the pulse radar device shown in FIG. 1 are replaced by a circulator 13 which is connected to the switch 5 and the mixer 6, and an antenna (transmission/reception means) 14 which is connected to the circulator 13.

Subsequently, the operation of the pulse radar device in accordance with the second embodiment of the present invention will be described with reference to the drawings.

The modulation signal generation portion 2 which is controlled by the CPU 1 generates a modulation signal for performing the frequency modulation of the VCO 3. The carrier wave generated by the VCO 3 which has been modulated in frequency is distributed into the switch 5 and the mixer 6 by the distributor 4. In the switch 5, the pulse modulation is conducted by the control of the CPU 1, and the pulse-modulated signal is supplied to the antenna 14 via the circulator 13. The pulse-modulated signal is transmitted to the target substance as an electromagnetic wave by the antenna 14.

The reflection wave reflected by the target substance is received by the antenna 14. The received signal is transmitted to the mixer 6 via the circulator 13.

The operations of the components subsequent to the mixer 6 are completely identical with that of the above-mentioned first embodiment, and therefore its description will be omitted.

As described above, since the circulator 13 enables the transmission and reception operation to be conducted by one antenna 14, the downsizing and the low prices can be realized.

(Third Embodiment)

Figure 6:
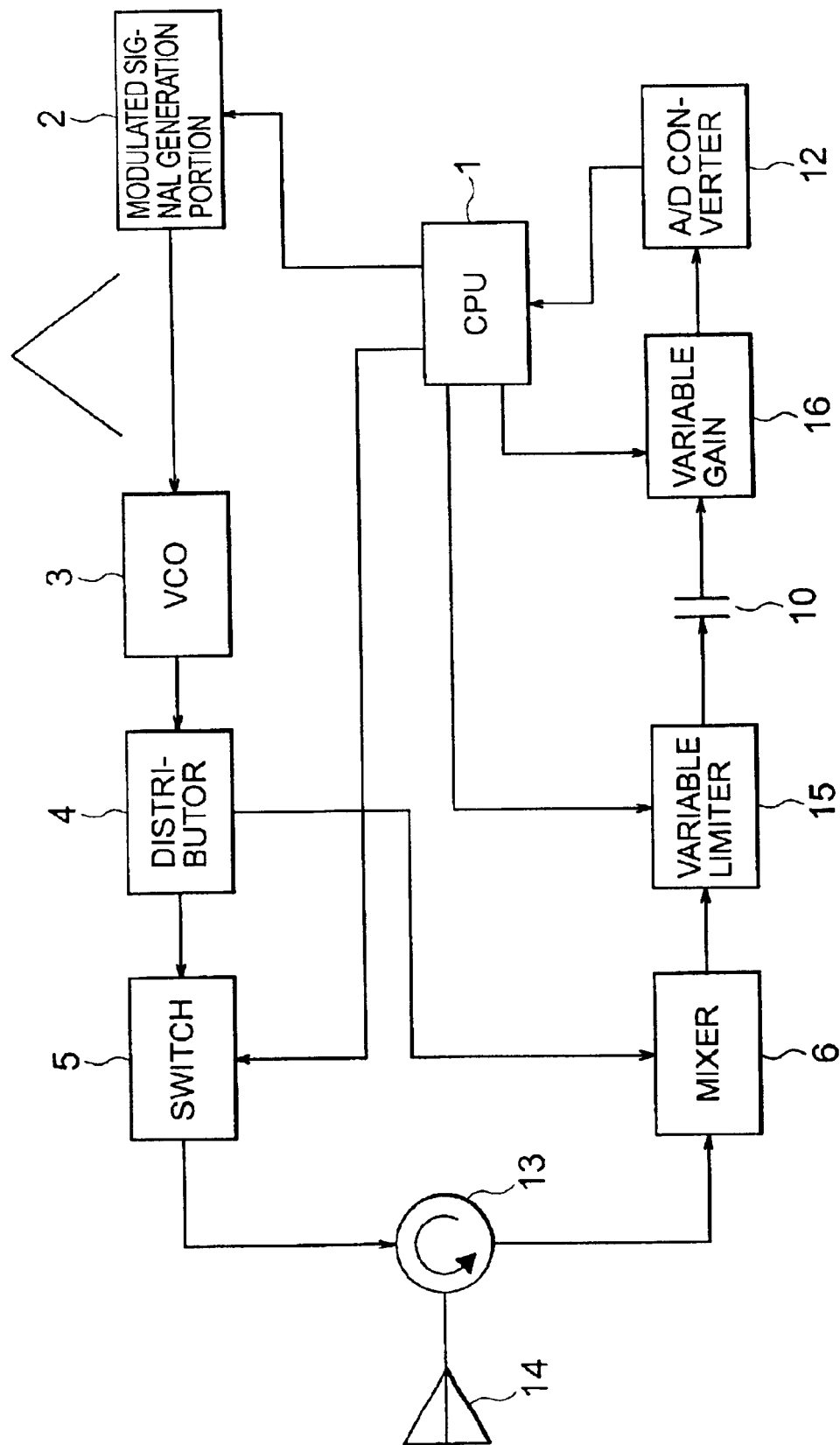
FIG. 6 is a diagram showing a structure of a pulse radar device in accordance with a third embodiment of the present invention.

A pulse radar device in accordance with a third embodiment of the present invention will be described with reference to the drawings. FIG. 6 is a diagram showing a structure of the pulse radar device in accordance with the third embodiment of the present invention.

In FIG. 6, the limiter 9 and the amplifier 11 of the pulse radar device shown in FIG. 5 are replaced by a variable limiter (limiting means) 15 and a variable gain amplifier (amplification means) 16 in the third embodiment.

Subsequently, the operation of the pulse radar device in accordance with the third embodiment of the present invention will be described with reference to the drawings.

Figure 7:
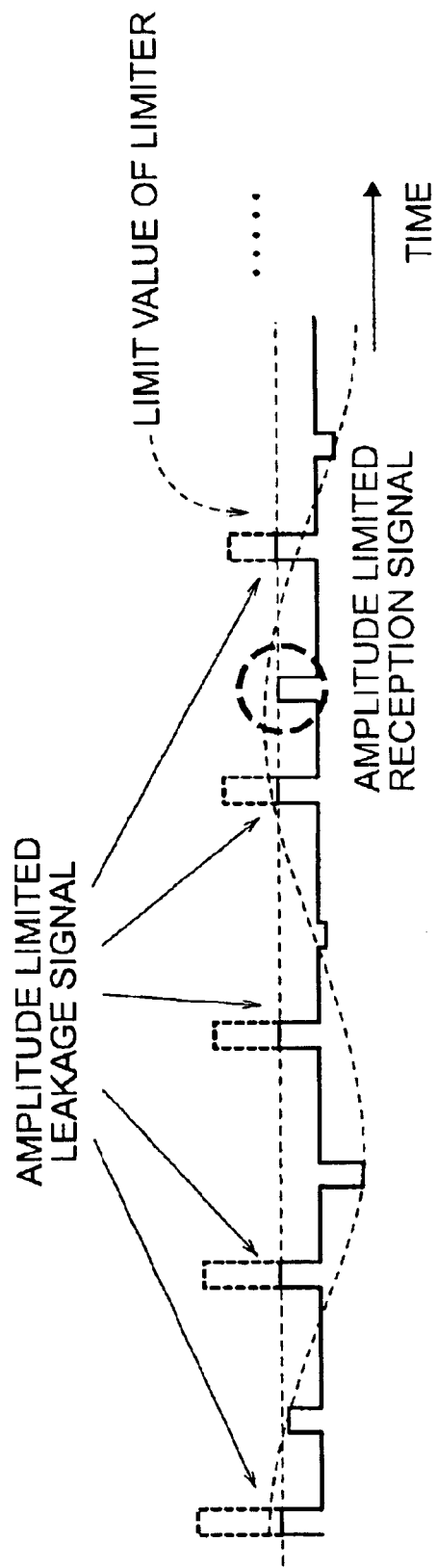
FIG. 7 is a graph showing a state where a reception signal of the pulse radar device is limited in amplitude in accordance with the third embodiment of the present invention.
Figure 8A:
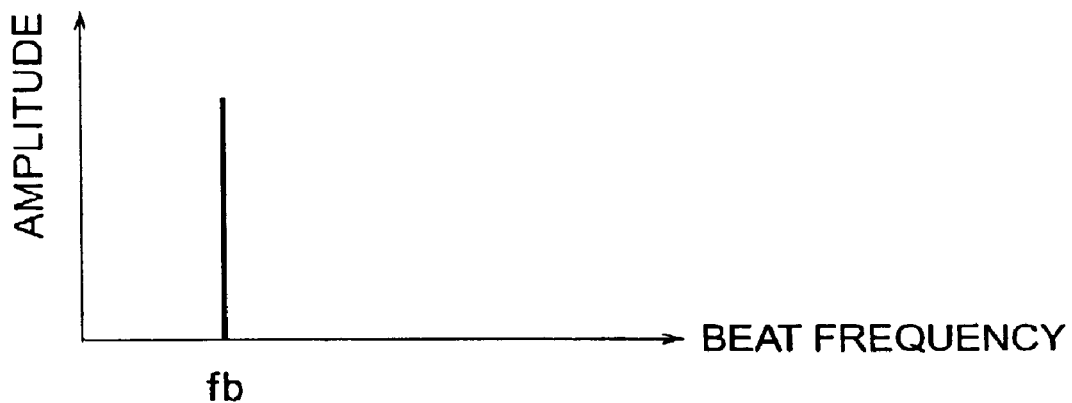
FIGS. 8A and 8B are graphs showing reception spectrums in the case where the reception signal of the pulse radar device is not limited in amplitude and in the case where the reception signal is limited in amplitude in accordance with the third embodiment of the present invention.
Figure 8B:
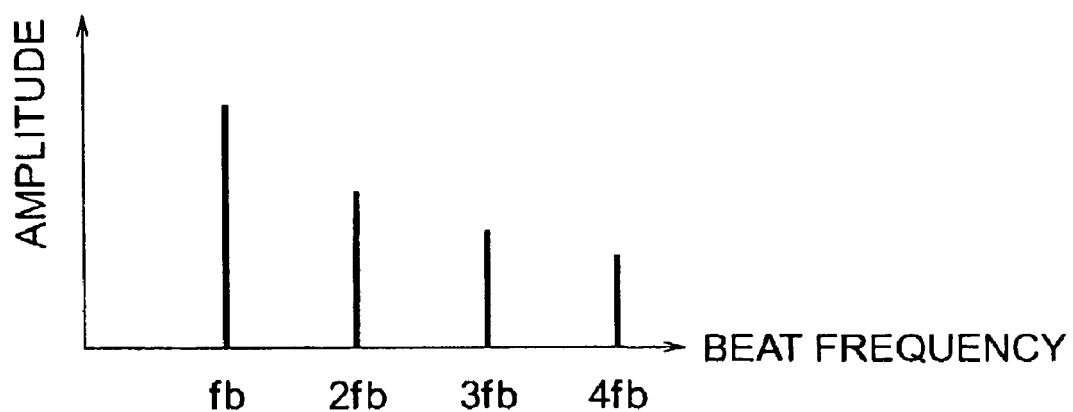

FIG. 7 is a graph showing a state where a reception signal of the pulse radar device is limited in amplitude in accordance with the third embodiment of the present invention. Also, FIGS. 8A and 8B are graphs showing reception spectrums in the case where the reception signal of the pulse radar device is not limited in amplitude and in the case where the reception signal is limited in amplitude in accordance with the third embodiment of the present invention.

In an initial operation state, the gain of a variable gain amplifier 16 is set to a maximum gain by the CPU 1 so that even a target substance as small as possible can be detected. Also, the amplitude limit value of the variable limiter 15 is controlled by the CPU 1 in such a manner that the demodulation signal falls within the maximum input range of the A/D converter 12. In other words, assuming that the amplitude limit value of the variable limiter 15 is L, the gain of the variable gain amplifier 16 is G and the maximum input range of the A/D converter 12 is Vad, the amplitude limit value L is controlled according to the following expression (2).

$$L=Vad/G \quad (2)$$

Through the same operation as that in the above-mentioned second embodiment, the reception signal that has been quantized by the A/D converter 12 is subjected to FFT (fast Fourier transform) operation by the CPU 1 to extract a beat frequency. In this situation, in the case where the amplitude limit value of the variable limiter 15 is too small with respect to the reception signal, not only the leakage signal but also the reception signal are limited in amplitude as shown in FIG. 7.

In a normal state where the reception signal is not limited in amplitude, as shown in FIG. 8A, a single spectrum appears in the frequency which is a beat frequency fb, but in the case where the reception signal is limited in amplitude, a spectrum shown in FIG. 8B appears because the beat signal is distorted. That is, there appear higher harmonics of integral multiples due to the distortion.

In the case where the higher harmonic is thus detected, it is judged that the gain G of the variable gain amplifier 16 is excessive, and the gain G of the variable gain amplifier 16 is reduced by a given amount. Also, with this, the amplitude limit value L of the variable limiter 15 is controlled in accordance with the expression (2). With this control, when there comes to a state where no higher harmonics appears, the gain G of the variable gain amplifier 16 is allowed to increase in order to detect the small target substance again.

As described above, the generation of the higher harmonics is detected and the gain of the variable gain amplifier 16 is controlled by the CPU 1, thereby being capable of detecting the small target substance while preventing the amplitude limit of the reception signal.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A pulse radar device, comprising:

a modulation signal generation portion for generating a modulation signal;

an oscillation means for oscillating a carrier wave which has been frequency-modulated on the basis of the modulation signal;

a distributor for distributing the carrier wave generated by the oscillation means;

a pulse modulation means for modulating the carrier wave distributed by the distributor to a pulse wave;

a transmission means for transmitting the pulse wave modulated by the pulse modulation means as an electromagnetic wave;

a reception means for receiving a reflection wave obtained by reflecting the electromagnetic wave transmitted from the transmission means by a target substance;

a demodulation means for demodulating a reception signal received by the reception means on the basis of the carrier wave distributed by the distributor;

a limiting means for limiting an amplitude of a leakage signal which appears in a pulse signal demodulated by the demodulation means;

a capacitor for removing a d.c. component from the pulse signal;

an amplification means for amplifying the pulse signal which passed through the capacitor;

an A/D converter for quantizing the pulse signal that has been amplified by the amplification means; and a CPU for calculating a distance and a relative speed to the target substance on the basis of the pulse signal that has been quantized by the A/D converter.

2. A pulse radar device according to claim 1, wherein the transmission means and the reception means comprise one transmission/reception means for transmitting the pulse wave modulated by the pulse modulation means as the electromagnetic wave, and inputting the received reflection wave to the demodulation means.

3. The pulse radar device according to claim 1, wherein when higher harmonics is detected based on the pulse signal that has been quantized by the A/D converter, the CPU reduces a gain of the amplification means by a given amount and controls an amplitude limit value of the limiting means according to an expression $L=Vad/G$, where L is the amplitude limit value of the limiting means, Vad is a maximum input range of the A/D converter and G is the gain of the amplification means.

4. The pulse radar device according to claim 2, wherein when higher harmonics is detected based on the pulse signal that has been quantized by the A/D converter, the CPU reduces a gain of the amplification means by a given amount and controls an amplitude limit value of the limiting means according to an expression $L=Vad/G$, where L is the amplitude limit value of the limiting means, Vad is a maximum input range of the A/D converter and G is the gain of the amplification means.

* * * * *